United States Patent
Froeschl et al.

(10) Patent No.: US 6,745,144 B2
(45) Date of Patent: Jun. 1, 2004

(54) CIRCUIT ARRANGEMENT FOR A MOTOR VEHICLE

(75) Inventors: Joachim Froeschl, Seefeld (DE); Martin Kaltenbrunner, Taufkirchen (DE); Richard Bader, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/864,161

(22) Filed: May 25, 2001

(65) Prior Publication Data

US 2001/0047228 A1 Nov. 29, 2001

(30) Foreign Application Priority Data

May 26, 2000 (DE) .......................... 100 26 124

(51) Int. Cl.⁷ .............................. G06F 19/00
(52) U.S. Cl. ...................................... 702/108
(58) Field of Search ................ 702/108, 118, 702/122, 109, 117, 121; 370/242, 257; 701/29, 33

(56) References Cited

U.S. PATENT DOCUMENTS

| | | | |
|---|---|---|---|
| 6,201,316 B1 * | 3/2001 | Knecht | 307/10.1 |
| 6,233,509 B1 * | 5/2001 | Becker | 701/29 |
| 2002/0024929 A1 * | 2/2002 | Brueckner et al. | 370/222 |

FOREIGN PATENT DOCUMENTS

| | | |
|---|---|---|
| DE | 41 10 372 | 10/1991 |
| DE | 41 26 449 | 2/1992 |
| DE | 43 22 249 | 4/1994 |
| DE | 37 88 601 | 6/1994 |
| DE | 38 53 022 | 8/1995 |
| DE | 196 00 644 | 4/1997 |
| DE | 692 18 653 | 11/1997 |
| DE | 198 05 464 | 8/1999 |
| DE | 198 43 446 | 3/2000 |
| DE | 198 43 447 A1 | 3/2000 |
| DE | 198 43 448 | 3/2000 |
| DE | 198 43 449 | 6/2000 |
| WO | WO 91/13504 | 9/1991 |
| WO | WO 98/26958 | 6/1998 |
| WO | 00/18064 * | 3/2000 |

* cited by examiner

*Primary Examiner*—Michael Nghiem
(74) *Attorney, Agent, or Firm*—Crowell & Moring LLP

(57) ABSTRACT

On a circuit arrangement for a motor vehicle that is equipped with a multitude of functional modules, which are connected with a joint gateway via at least two bus systems, the gateway is equipped with a receiving channel and a transmitting channel, respectively, for each bus system. The gateway contains testing instruments, which monitor the successful transmission of data to a functional module of a data bus system and/or the successful reception of data from a functional module of a data bus system. The gateway is also equipped with blocking instruments, which block the receiving channel if transmission was not successful and/or block the transmitting channel if reception was not successful.

6 Claims, 2 Drawing Sheets

000
CIRCUIT ARRANGEMENT FOR A MOTOR VEHICLE

BACKGROUND AND SUMMARY OF THE INVENTION

This application claims the priority of German Application No. 100 26 124.8, filed May 26, 2000, the disclosure of which is expressly incorporated by reference herein.

The invention relates to a circuit arrangement for a motor vehicle that is equipped with a multitude of functional modules, which are connected through at least two bus systems with a joint gateway.

Such a circuit arrangement is known for example from German Patent document DE 196 00 644 A1. This familiar circuit arrangement is equipped with two bus systems and a joint gateway, which consists of two intelligent control devices that have been combined into one central unit. The control devices, however, can also each be functional modules. Each control device of this central unit is allocated a bus system. For the purpose of data exchange among the buses, the control devices are equipped with a defined interface. In this familiar circuit arrangement, emphasis is placed on flexibility. A mechanism for handling errors is not mentioned in the reference.

In the future, different, preferably linear, bus systems are supposed to be cross-linked with each other increasingly in motor vehicles, onto which particularly a logical ring structure is supposed to be superimposed, i.e. the functional modules transmit across the buses in a specified sequence one after the other. The transfer interruption between the bus systems has a particularly unpleasant effect because the entire network is disrupted.

The object of the invention, particularly with regard to planned future bus systems in motor vehicles with communication among the buses, consists of increasing the availability of the motor vehicle functions.

This problem is solved with a circuit arrangement for a motor vehicle that is equipped with a multitude of functional modules, which are connected through at least two bus systems with a joint gateway. The gateway is equipped with a receiving channel ($E_A$, $E_B$, $E_C$) and a transmitting channel ($S_A$, $S_B$, $S_C$), respectively, for each bus system (A, B, C). The gateway contains testing instruments, which monitor the successful transmission of data to a functional module (2, 3, 5; 1, 4, 6; 7) of a data bus system (A; B; C) and/or the successful reception of data from a functional module of a data bus system. The gateway is also equipped with blocking instruments, which block the receiving channel if transmission was not successful and/or block the transmitting channel if reception was not successful. Advantageous developments of the invention are further described herein.

The circuit arrangement for a motor vehicle in accordance with the present invention is equipped with a multitude of functional modules, which are divided between at least two bus systems. The bus systems in turn are connected via a joint gateway. The gateway is equipped with a receiving channel and a transmitting channel, respectively, for each bus system. Additionally, the gateway contains testing instruments, which monitor the successful transmission of data to a functional module of a data bus system and/or the successful reception of data from a functional module of a data bus system. The gateway is also equipped with blocking instruments, which block the receiving channel if transmission was not successful and/or block the transmitting channel if reception was not successful.

These receiving and/or transmitting blocking instruments prevent, for example, that ring information of the bus system with the defective transmitting and/or receiving channel appears on the other bus systems. In this way, an interruption of the logical ring can be recognized promptly for all bus systems. The logical ring for all bus systems is therefore purposely abandoned and, while taking the blocked bus system into consideration, a new logical structure is re-formulated so as to pass on ring information among the bus systems only via the non-blocked bus systems. The blocked bus system continues to work on its own, in a decoupled manner. This way, calculation time intensive disruption routines during data transfer are largely avoided.

As an additional note, it should be pointed out that the receiving and transmitting blockage can also occur for other reasons, e.g. from application or diagnostic functions.

In a beneficial embodiment of the invention, the gateway is equipped with repeating instruments with which a repetition of the transmission of data across the transmitting channel that is allocated to the blocked receiving channel and/or with which the reception of data via the receiving channel that is allocated to the blocked transmitting channel is attempted under specific conditions. The gateway opens the blocking instruments when renewed transmission attempts and/or reception attempts are successful.

Such a "revival method" further increases availability because an emergency run in the form of a re-formulation of the bus systems, which can lead to at least minor functional restrictions, is not maintained unnecessarily.

The gateway is preferably an integrated intermediate unit between the bus systems that are connected to the gateway and another functional module. The additional functional module is considered an autonomous bus system in the form of a virtual bus. The gateway and the additional functional module can form a central unit, which has only one CPU.

Other objects, advantages and novel features of the present invention will become apparent from the following detailed description of the invention when considered in conjunction with the accompanying drawings.

DETAILED DESCRIPTION OF THE DRAWINGS

Figure 1:
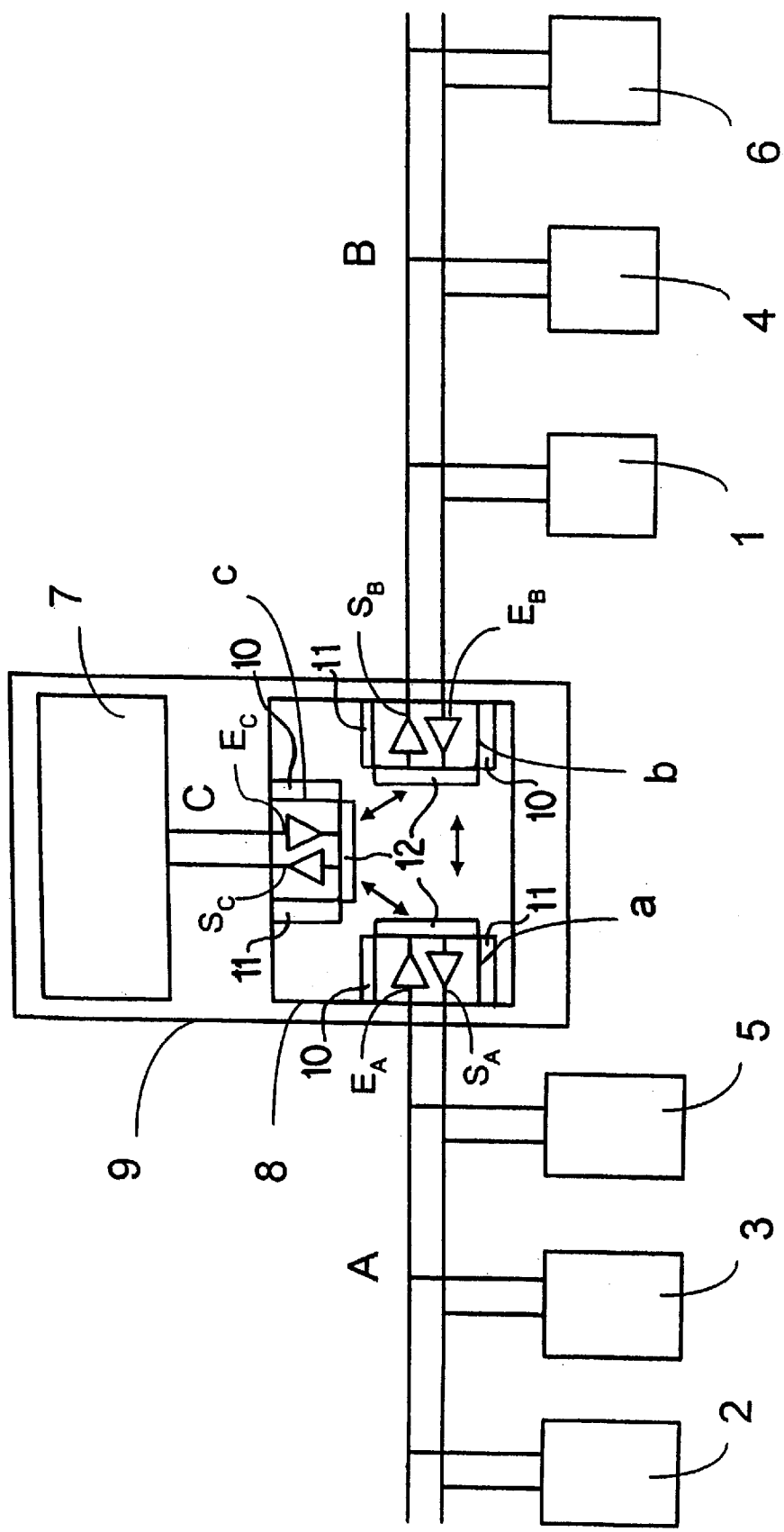
FIG. 1 is a schematic diagram of one possible circuit arrangement in accordance with the present invention with two actual bus systems as well as one virtual bus system.

A fast bus system A, which is allocated e.g. to the drive management area, is equipped with three intelligent functional modules 2, 3, 5 (e.g. a motor control mechanism, a transmission control mechanism and a brake control mechanism). A bus system B, which is slower compared to the bus system A and is allocated e.g. to the chassis management area, is equipped with three additional intelligent functional modules 1, 4, 6 (e.g. a light control mechanism, an air conditioning control mechanism and a seat adjustment control mechanism). The two bus systems A and B are connected via a joint gateway. The gateway 8 is an integrated intermediate unit between the bus systems A and B as well as an additional functional module 7. The additional functional module 7 is considered to be an autonomous virtual bus system C. The gateway 8 and the additional functional module 7 form a central unit 9. The functional module 7 and/or the virtual bus system C, however, are not absolutely required for the invention. Additional bus systems can also be connected to the gateway 8.

The gateway 8 is equipped with one receiving channel $E_A$, $E_B$, $E_C$, respectively, and one transmitting channel $S_A$, $S_B$, $S_C$, respectively, for each bus system A, B, C, as well as testing 10, blocking 11 and repeating instruments 12.

The testing instruments in the gateway 8 monitor the successful transmission and/or reception via the transmitting channels and/or the receiving channels. In the following, for example, a superimposed logical ring in accordance with the sequence of the functional module numbering 1 through 7 is assumed. The functional module 1 from bus B therefore transmits data to the functional module 2 of the bus A across the buses. The functional module 2 from bus A transmits data to the functional module 3 within the same bus. The functional module 3 from bus A transmits data to the functional module 4 of the bus B across the buses. The functional module 4 from bus B transmits data to the functional module 5 of bus A across the buses. The functional module 5 from bus A transmits data to the functional module 6 of bus B across the buses. The functional module 6 from bus B transmits data to the functional module 7 of the virtual bus C across the buses. The functional module 7 from bus C transmits data to the functional module 1 of bus B across the buses. This closes the ring and the process begins again.

Figure 2:
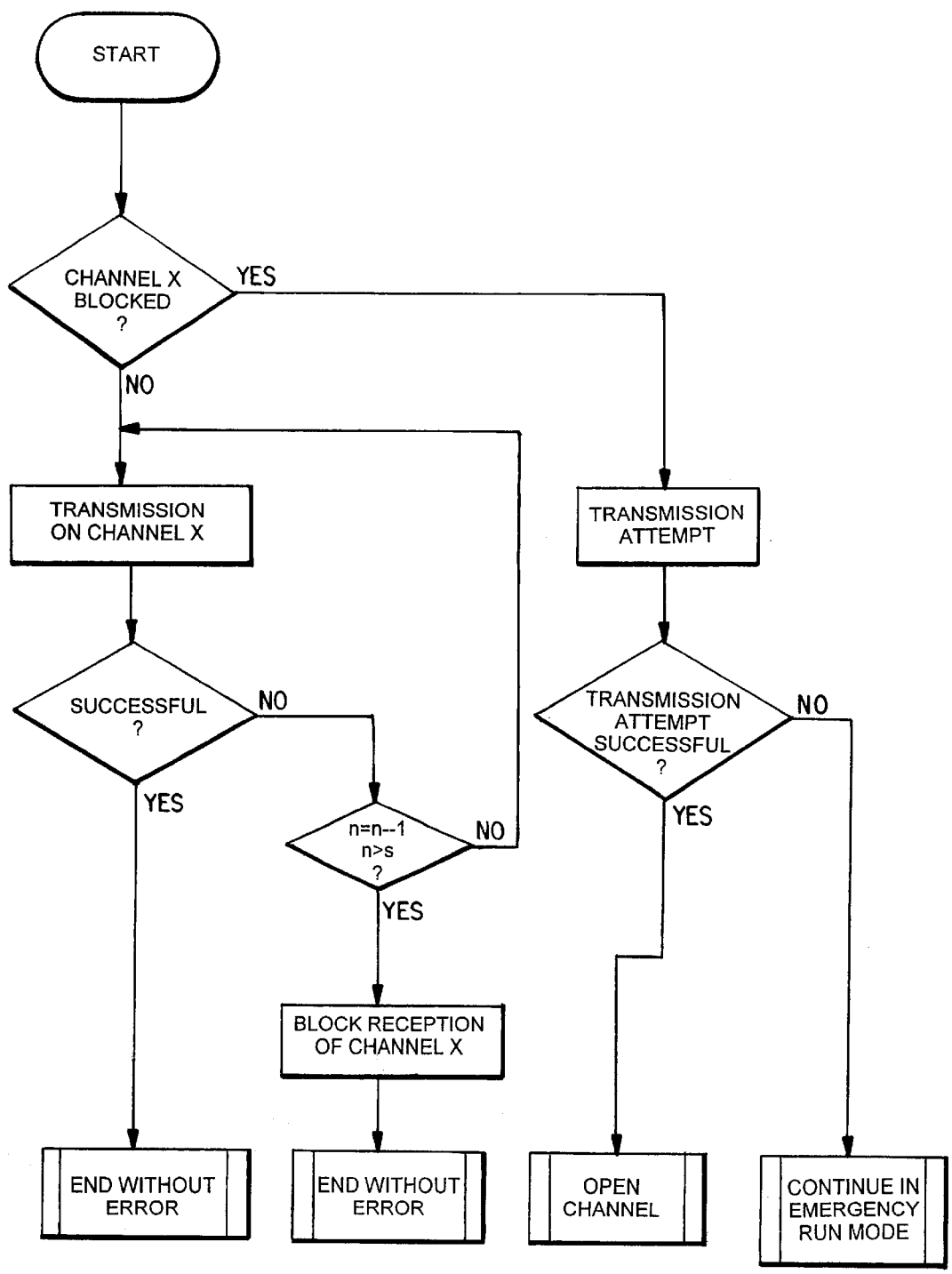
FIG. 2 a simplified logic diagram for executing the testing, blocking, repeating and unlocking measures of the gateway according to the invention.

Assuming, for example, that before transmitting the data from the functional module 3 of bus A to the functional module 4 of bus B, the transmitting channel $S_B$ became defective. FIG. 2 will explain the connections based on this example.

In the following, the transmitting channel $S_A$ and the receiving channel $E_A$ are combined into one channel a, the transmitting channel $S_B$ and the receiving channel $E_B$ are combined into one channel b and the transmitting channel $S_C$ and the receiving channel $E_C$ are combined into one channel c. According to FIG. 2, the gateway 8 initially checks whether a channel x (x=a, b, c), i.e. for example channel b, is blocked. This inquiry refers particularly to the active blockage of the receiving channel $E_B$ or to the active blockage of the transmitting channel $S_B$. When the above-mentioned error situation occurs for the first time, this inquiry is initially negated.

Since according to the example the data of the functional module 3 cannot be sent to the functional module 4 via channel b, the gateway 8 receives no confirmation signal from the functional module 4 regarding reception of the data. Transmission therefore was not successful. According to FIG. 2, an inquiry can be sent (n=n+1; n>S) as to whether an unsuccessful transmission had already been performed for a specified number S of transmission attempts. If this is the case, the blocking instruments of gateway 8 block the reception of all data from bus B by closing the receiving channel $E_B$. This means that channel b is blocked.

The logical ring 1 through 7 is then abandoned across all bus systems A, B, C and, while taking the blocked bus system B into consideration, a new logical structure is re-formulated so that the ring information can be forwarded only via the non-blocked bus systems A, C across the buses. A new logical ring, e.g. 2=>3=>5=>7=>2 etc. can, for example, be superimposed onto the bus systems A, C. The blocked bus system B continues to work on its own, in a decoupled fashion, e.g. 1=>4=>6=>1 etc. In accordance with the invention, in the above-mentioned example no disruptions occur if the logical ring constantly breaks down and tries to establish itself.

When the routine is re-started, e.g. when the motor vehicle is newly started or after a specified period of time, and it is noticeable that the channel b and/or the receiving channel $E_B$ is blocked, the gateway 8 starts a transmission attempt via this channel b based on the repeating instruments from the gateway 8. If the transmission attempt is successful, i.e. when a confirmation signal is received e.g. from a specified receiving functional module of the bus system B, the gateway 8 opens its blocking instruments again in order to enable reception of the data from bus B. If the renewed transmission attempt is not successful, the receiving channel $E_B$ remains blocked.

Similarly, the appropriate transmitting channel is blocked in the case of a defective receiving channel. However, reception readiness is maintained in order to be able to react promptly when the receiving channel has been revived. When the receiving channel has been restored, the appropriate transmitting channel must also be reopened.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A circuit arrangement for a motor vehicle equipped with multiple functional modules, the circuit arrangement comprising:
   a joint gateway;
   at least two bus systems through which said multiple functional modules are connected with the joint gateway;
   wherein said gateway includes a receiving channel for receiving data from and a transmitting channel for transmitting data to, respectively, each of said at least two bus systems;
   wherein said gateway further comprises testing instruments which monitor a successful transmission of data to a functional module of one of said bus systems and/or a successful reception of data from a functional module of one of said bus systems; and
   wherein said gateway also comprises blocking instruments which block the receiving channel of a particular one of said two bus systems if a transmission to a functional module of the particular one of said two bus systems was not successful and/or block the transmitting channel of the particular one of said two bus systems if the reception from a functional module of the particular one of said two bus systems was not successful.

2. The circuit arrangement according to claim 1, wherein said gateway further comprises repeating instruments, said repeating instruments repeating the transmission of data via the transmitting channel allocated to a blocked receiving channel and/or the reception of data via the receiving channel allocated to the blocked transmitting channel under certain conditions;

wherein said gateway opens said receiving channel and/or reception channel when renewed transmission attempts and/or reception attempts are successful, respectively.

3. The circuit arrangement according to claim 2, wherein said gateway is an integrated intermediate unit arranged between said at least two bus systems and an additional functional module, said additional functional module being considered an autonomous virtual bus system.

4. The circuit arrangement according to claim 3, wherein said gateway and said additional functional module form a central unit.

5. The circuit arrangement according to claim 1, wherein said gateway is an integrated intermediate unit arranged between said at least two bus systems and an additional functional module, said additional functional module being considered an autonomous virtual bus system.

6. The circuit arrangement according to claim 5, wherein said gateway and said additional functional module form a central unit.

* * * * *